(12) United States Patent
Fleck et al.

(10) Patent No.: US 7,685,538 B2
(45) Date of Patent: Mar. 23, 2010

(54) METHOD OF TRIGGERING FUNCTIONS IN A COMPUTER APPLICATION USING A DIGITIZER HAVING A STYLUS AND A DIGITIZER SYSTEM

(75) Inventors: David Fleck, Vancouver, WA (US); Sadao Yamamoto, Saitama (JP)

(73) Assignee: Wacom Co., Ltd., Saitama-Ken (JP)

( * ) Notice: Subject to any disclaimer, the term of this patent is extended or adjusted under 35 U.S.C. 154(b) by 1677 days.

(21) Appl. No.: 10/354,982

(22) Filed: Jan. 31, 2003

(65) Prior Publication Data

US 2004/0150631 A1  Aug. 5, 2004

(51) Int. Cl.
*G06F 3/00* (2006.01)
*G09G 5/00* (2006.01)
*G09G 5/08* (2006.01)

(52) U.S. Cl. .................. 715/863; 345/179; 345/157
(58) Field of Classification Search ................ 345/173, 345/179, 157; 715/863
See application file for complete search history.

(56) References Cited

U.S. PATENT DOCUMENTS

| | | | |
|---|---|---|---|
| 4,686,332 A * | 8/1987 | Greanias et al. ............ 345/173 |
| 4,786,764 A * | 11/1988 | Padula et al. ............. 178/19.04 |
| 5,148,155 A | 9/1992 | Martin et al. |
| 5,488,204 A | 1/1996 | Mead et al. |
| 5,510,813 A | 4/1996 | Makinwa et al. |
| 5,543,591 A | 8/1996 | Gillespie et al. |
| 5,596,656 A * | 1/1997 | Goldberg .................... 382/186 |
| 5,635,683 A * | 6/1997 | McDermott et al. ....... 178/19.04 |
| 5,757,363 A | 5/1998 | Oishi et al. |
| 5,764,218 A | 6/1998 | Della Bona et al. |
| 5,793,360 A * | 8/1998 | Fleck et al. ................. 345/179 |
| 5,880,411 A | 3/1999 | Gillespie et al. |
| 5,889,236 A | 3/1999 | Gillespie et al. |
| 5,940,158 A * | 8/1999 | Kawabata ................... 349/179 |
| 5,969,708 A | 10/1999 | Walls |
| 5,969,712 A | 10/1999 | Morita et al. |
| 5,973,676 A | 10/1999 | Kawakura |
| 5,990,875 A | 11/1999 | Bi et al. |
| 5,995,083 A | 11/1999 | Sato et al. |
| 5,995,084 A | 11/1999 | Chan et al. |
| 6,028,271 A | 2/2000 | Gillespie et al. |
| 6,061,051 A | 5/2000 | Chan et al. |
| 6,094,197 A | 7/2000 | Buxton et al. |
| 6,104,388 A * | 8/2000 | Nagai et al. ................. 345/179 |
| 6,153,836 A | 11/2000 | Goszyk |
| 6,167,439 A * | 12/2000 | Levine et al. ............... 709/217 |

(Continued)

FOREIGN PATENT DOCUMENTS

JP  7 261906  10/1995

*Primary Examiner*—William L Bashore
*Assistant Examiner*—Jordany Núñez
(74) *Attorney, Agent, or Firm*—Berenato & White, LLC

(57) ABSTRACT

A method of triggering functions in a computer application comprises the steps of: providing a digitizer having a pointing device, wherein the digitizer and pointing device are operably associated with a computer having an operating system and an application; applying pressure to the digitizer with the pointing device; sensing the applied pressure; triggering in the application a first function if the sensed applied pressure exceeds a first pressure threshold; and triggering in the application a second function if the sensed applied pressure exceeds a second pressure threshold. The second pressure threshold is greater than the first pressure threshold.

40 Claims, 4 Drawing Sheets

U.S. PATENT DOCUMENTS

| | | |
|---|---|---|
| 6,262,719 B1 | 7/2001 | Bi et al. |
| 6,295,052 B1 | 9/2001 | Kato et al. |
| 6,335,727 B1 | 1/2002 | Morishita et al. |
| 6,337,681 B1 | 1/2002 | Martin |
| 6,340,967 B1 | 1/2002 | Maxted |
| 6,760,041 B2 * | 7/2004 | Komata ...................... 345/660 |
| 6,888,537 B2 * | 5/2005 | Benson et al. .............. 345/173 |

\* cited by examiner

METHOD OF TRIGGERING FUNCTIONS IN A COMPUTER APPLICATION USING A DIGITIZER HAVING A STYLUS AND A DIGITIZER SYSTEM

FIELD OF THE INVENTION

The present invention relates to a method of triggering functions in a computer application by applying pressure to a digitizer using a pointing device, such as a stylus or an airbrush. The applied pressure is sensed, and a first function is triggered if the sensed applied pressure exceeds a first pressure threshold. A second function is triggered if the sensed applied pressure exceeds a second pressure threshold.

DESCRIPTION OF THE PRIOR ART

User interface applications for computer systems can receive input from both pointing devices and keyboards. A user may prefer to interact with an application by using a pointing device. As commonly known in the art, a pointing device is a tool that lets the user move a pointer around on a display. The pointing device also has some means of activating a displayed object under the pointer. The pointing device allows the user to directly manipulate the displayed objects. Rather than entering a keyboard command for each action, a user can point to an object and directly manipulate it using the pointing device. For example, in systems using a graphical user interface such as the Windows™ Operating System by Microsoft Corporation ("Windows"), the user may select a particular icon displayed on the display with the pointing device.

The most typical pointing device is a mouse. However, a digitizer system, a track ball, a joystick, and other such tools also work as pointing devices. Objects on the display can be manipulated by combining the pointing device with its associated buttons, such as mouse buttons. Many pointing devices have at least left and right buttons.

A user can combine button press and release actions along with pointing device movements to activate elements of applications and components. Various common button actions include: 1) pressing a button without releasing it ("press"); 2) releasing a button after pressing it ("release"); 3) pressing and releasing a button without moving the pointer ("click"); 4) pressing a button without releasing it and then moving the position of the pointer ("drag"); 5) a number of clicks in quick succession ("multiclick" and/or "double click"); and 6) a number of clicks in quick succession without a final release ("multipress"). It is understood by those skilled in the art that other button press and release actions, in combination with pointer movements, activate elements of applications. The "double click" action is well known in the art, and used in computer applications using a graphical user interface such as Windows™.

If the pointing device is a mouse, a button press may also be described as a "mouse down" action. A button release may be described as a "mouse up" action. A double click action on the mouse usually requires that the user press the button on the top of the mouse twice in quick succession without moving the mouse (or pointer on the display). This action is relatively easy with the mouse, given the downward pressure on the mouse button during the double click tends to hold the mouse steady due to friction.

However, a user may also use a graphics digitizer having a pointing device, such as a stylus or an airbrush. Various designs for such pointing devices are known in the art, such as those disclosed in U.S. Pat. No. 5,977,959 to Katsurahira et al., U.S. Pat. No. 6,259,438 to Fleck et al., and U.S. Pat. No. 5,969,296 to Yamamoto et al., the disclosures of which are incorporated herein by reference.

As best shown in FIG. 1, a digitizer 10 and a stylus 12 are operably associated with a computer 14 and a display 16. The computer 14 has an operating system and an application, and an associated pointer 17 is displayed on the display. Compared to a mouse, the digitizer 10 and stylus 12 are better suited for applications such as drawing or photo manipulation. It is well known in the art that the digitizer 10 usually provides a surface 18 upon which pressure is applied by the pen-shaped stylus 12. Pressure may be detected either by the digitizer 10, the stylus 12, or both.

The stylus 12 generally comprises an elongated pen-shaped body 20 having a tip 22 at one end for contacting the surface 18 of the digitizer 10, as best shown in FIG. 1. A user may apply pressure, or force, on the surface 18 of the digitizer 10 with the tip 22 of the stylus 12. Either the stylus 12 or the digitizer 10 has a sensor 24 for detecting the applied pressure when the tip 22 of the stylus 12 contacts the surface 18 of the digitizer 10. Preferably, sensor 24 is located at the tip 22 of the stylus 12, as best shown in FIG. 1. In either case, the sensor 24 may be a mechanical switch, such as a dome switch, or it may be a pressure sensor. If the sensor 24 is located at the tip 22 of the stylus 12, a "press" may be activated if the tip 22 depresses into the stylus body 20 when the tip 22 is pressed onto the surface 18 of the digitizer 10. If the sensor 24 is a pressure sensor, a single click may be generated by pressing the tip 22 onto a particular point of the surface 18 of the digitizer 10, and thereafter releasing the force of the tip 22 from the surface 18. Thus, the single click may be easily activated with the digitizer 10 and stylus 12.

In order to activate a double click using the digitizer 10 and stylus 12, a first click (as described above for a 'single click') must be activated when the pointer 17 on the display 16 is positioned at a particular point, followed by a second click with the pointer 17 remaining at the same particular point on the display 16. Thus, the tip 22 is pressed onto the surface 18 of the digitizer 10 at a particular point. The user then releases the force of the tip 22 from the surface 18, and then reapplies force to the surface 18 of the digitizer 10 with the tip 22 of the stylus 12 at the same particular point. Generally, the first and second clicks are in quick succession, for example less than 1 second.

The double click action is much more difficult with a digitizer 10 and stylus 12 as compared to a mouse. Generally, the surface area of the stylus tip 22 is relatively small, and may slide fairly easily on the surface 18 of the digitizer 10. It is usually advantageous that the stylus 12 slide across the surface 18, much like a pen across paper, given it is often used for drawing applications and the like. However, this results in a relatively small amount of friction to hold the tip 22 in place at a particular point on the digitizer surface 18 during the double click action. Furthermore, many users hold the stylus 12 at an angle relative to the digitizer surface 18. When the stylus 12 is held at an angle, depression of the tip 22 onto the surface 18 of the digitizer 10 often causes lateral movement on the surface 18. As such, the tip 22 may unintentionally slide across the surface 18 of the digitizer 10. Further, even if tip 22 remains stationary, the sensor 24 in the stylus body 20 may move laterally, if tip 22 includes a spring mechanism allowing movement of stylus body 20.

The prior art fails to disclose a method for triggering a function, such as a double click action, using a digitizer and a pointing device, such as a stylus, which avoids the above noted problems. One such attempt requires that the stylus tip maintain contact with the digitizer surface for a certain amount of time, after which time the function is triggered. However, the user is not able to adequately control activation of the desired function with such a method, given the user may inadvertently maintain contact between the pointing device and the digitizer. Furthermore, some applications may require continuous contact between the pointing device and the digitizer, such as drawing applications. In either case, the user must again release and reapply contact of the stylus with the digitizer to re-trigger the function. Another attempt provides a stylus having mechanical buttons thereon. However, such designs do not provide adequate control for triggering a function, such as a double click, given the user must manipulate the button, which affects user control of the stylus, or causes a release in force between the stylus and digitizer.

As such, there is a need for a system and method for activating a double click action with a digitizer 10 having a stylus 12 that is not prone to the aforesaid problems.

SUMMARY OF THE INVENTION

The present invention relates to a method of triggering functions in a computer application comprising the steps of: providing a digitizer having a pointing device, wherein the digitizer and pointing device are operably associated with a computer having an operating system and an application; applying pressure to the digitizer using the pointing device; sensing the applied pressure; triggering in the application a first function if the sensed applied pressure exceeds a first pressure threshold; and triggering in the application a second function if the sensed applied pressure exceeds a second pressure threshold, wherein the second pressure threshold is greater than the first pressure threshold.

The present invention also relates to a digitizer system comprising a digitizer operably associated with a computer having an operating system and an application. A pointing device for applying pressure to the digitizer is provided, which is operably associated with the digitizer. A sensor operably associated with one of the digitizer and the pointing device senses pressure applied to the digitizer by the pointing device. If the sensed applied pressure exceeds a first pressure threshold, a first function in the application is triggered. If the sensed applied pressure exceeds a second pressure threshold, a second function in the application is triggered. The second pressure threshold is greater than the first pressure threshold.

DETAILED DESCRIPTION OF THE INVENTION

Figure 1:
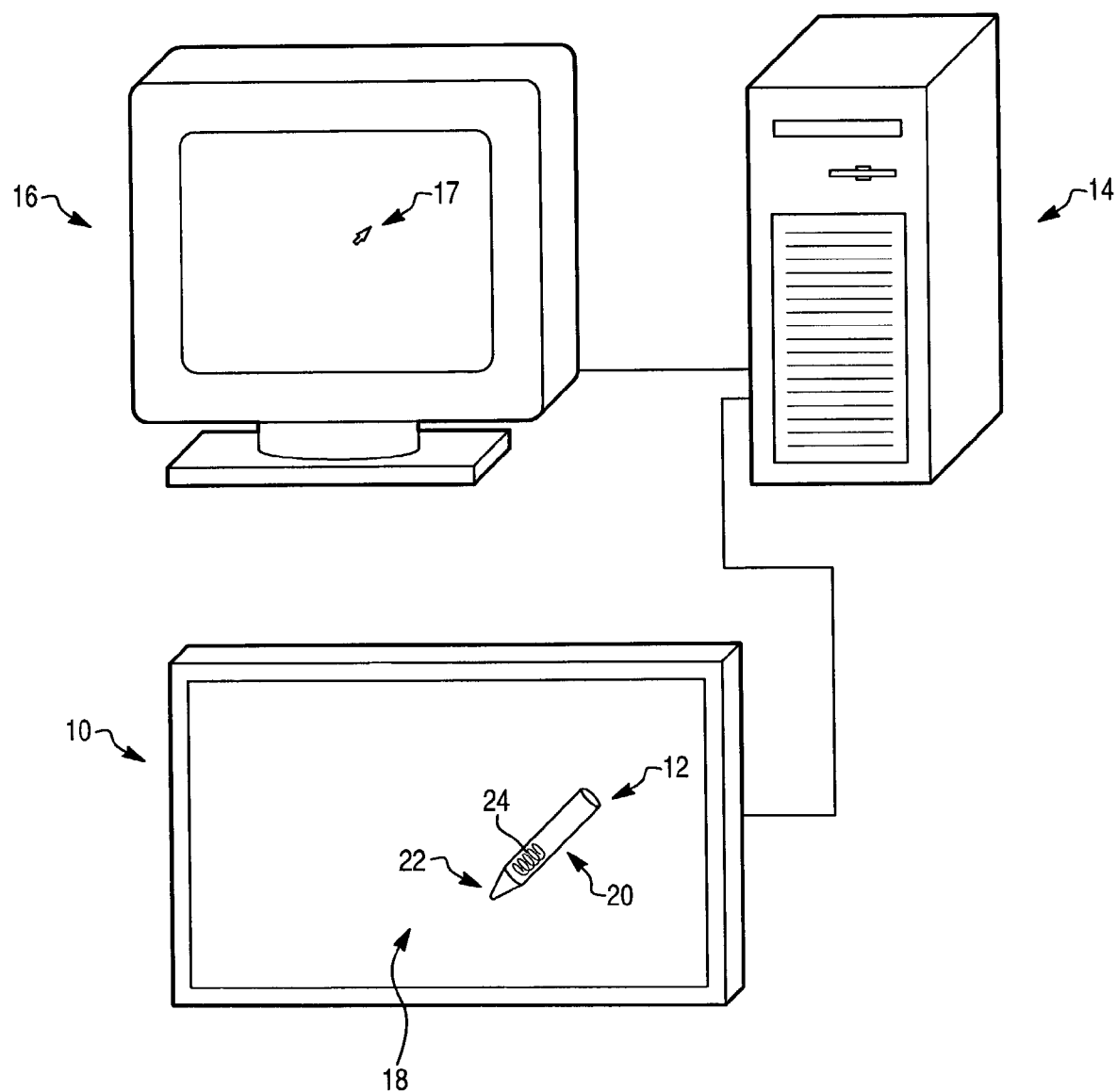
FIG. 1 is a schematic diagram of a digitizer having a pointing device, operably associated with a computer and display.

The disclosed invention involves a method of triggering functions in an application of a computer operating system using a digitizer 10 having a pointing device, such as a stylus or an airbrush, as best shown in FIG. 1. Digitizer 10 and stylus 12 are operably associated with a computer 14 and a display 16. Computer 14 has an operating system, such as Windows™, and an application, such as AutoCAD, Photoshop, etc. Pressure is applied to digitizer 10 with stylus 12. The applied pressure is sensed with a sensor 24, which may be either operably associated with digitizer 10, or operably associated with stylus 12.

Sensor 24 may be any type of sensor, such as a variable inductor, a variable capacitor, a variable resistor, a magnet sliding past a Hall effect sensor, a piezoelectric force sensor, or any other force or pressure sensor as known in the art. For example, sensor 24 may be positioned proximate a tip 22 of stylus 12, wherein stylus 12 comprises an elongated pen-shaped body 20 with tip 22 at one end, as best shown in FIG. 1. Sensor 24 may also function like a switch, having an open position and a closed position, whereby tip 22 is depressed into body 20, thereby triggering sensor 24. In the alternative, digitizer 10 may have a detecting surface 18 that senses pressure applied by stylus 12.

While the disclosed invention is explained with reference to a pen shaped stylus 12, it is understood that it may be implemented with any known pointing device used with digitizers, such as an airbrush. Therefore, reference to stylus 12 is made for purposes of explanation only, and the disclosed invention is not limited to same.

Moreover, the actual means of sensing pressure is not an important aspect of implementing the present invention. It is not an important aspect of this invention as to whether sensor 24 directly senses force, such as with a piezoelectric force sensor, or whether pressure is sensed. For example, the displacement of tip 22 of stylus 12 may be sensed by sensor 24, whereby a predetermined resistance to displacement of tip 22 is provided by a mechanical spring, resilient material such as rubber, or remote sensing of the strain of the tip material. In the alternative, tip 22 may include two switches, wherein a first switch is activated when a relatively small amount of pressure is applied, and a second switch is activated when a relatively large amount of pressure is applied. It should be understood that various means of sensing pressure are known in the art, such as in U.S. Pat. No. 5,134,689 to Murakami et al., or the above mentioned patents, the disclosures of which are incorporated herein by reference.

According to the present invention, pressure P, or force, is applied to digitizer 10 with stylus 12. The applied pressure P is sensed by sensor 24. The sensed applied pressure P is communicated to computer 14, as known in the art. Specifically, a signal corresponding to a value for the sensed applied pressure is transmitted to computer 14. The sensed applied pressure P is therefore recognized by computer 14 via the transmitted signal. A first function is triggered in an application, or the operating system, if the sensed applied pressure P exceeds a first pressure threshold A. A second function is triggered in the application, or the operating system, if the sensed applied pressure P exceeds a second pressure threshold B.

Figure 2:
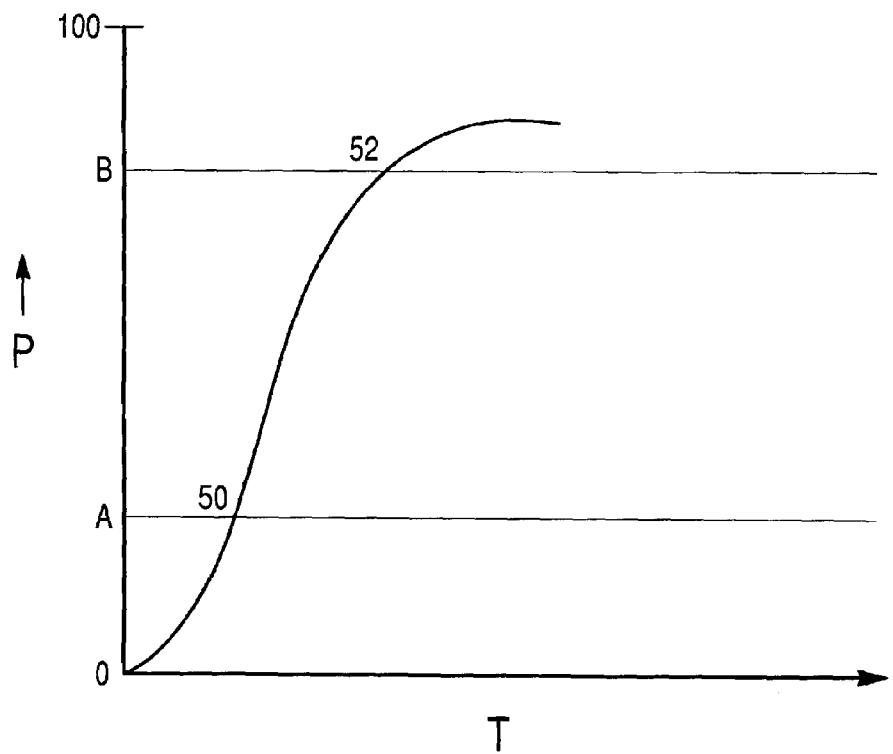
FIG. 2 is a graph of time versus pressure, with first and second pressure thresholds thereon.

As best shown in FIG. 2, applied pressure P is related to time T. Applied pressure P is graphed on the y-axis versus time T on the x-axis. Applied pressure P has a minimum value of zero at 0, when no force is being applied to surface 18 with stylus 12. Pressure may be applied to surface 18 with stylus 12, and sensed by sensor 24 up to a predetermined maximum force. The predetermined maximum force may be adjusted according to user preference, or by manufacturer specifications. The maximum predetermined force that may be applied to surface 18 is equal to 100% of the total force range that will be sensed by sensor 24, indicated at 100 in FIG. 2.

Before tip 22 of stylus 12 contacts surface 18 of digitizer 10, applied pressure P and time T are zero, as indicated at 0 in FIG. 2. When the user applies force to surface 18 with tip 22 of stylus 12, the applied pressure P is sensed by sensor 24, and communicated to computer 14. The sensed applied pressure P increases as the user depresses tip 22 onto surface 18 with increasing force. Sensor 24 may be located in either digitizer 10 or stylus 12, or both, for sensing applied pressure P. A first function in the application is triggered when the sensed applied pressure P exceeds first pressure threshold A, indicated at 50 in FIG. 2.

A second function in the application is triggered if the sensed applied pressure P exceeds a second pressure threshold B, indicated at 52 in FIG. 2. Second pressure threshold B is greater than the first pressure threshold A. However, first and second pressure thresholds, A and B, may be adjusted so that first and second functions are triggered at any desired percentage of the total force range, so long as second pressure threshold B is greater than first pressure threshold A. Depending on the operating system, application, and user preference, pressure thresholds A and B may vary.

In a first embodiment of the disclosed invention, sensor 24 operates like a switch having an open position and a closed position, similar to a button on a mouse. Sensor 24 is operably associated with tip 22 of stylus 12, as best shown in FIG. 1. Sensor 24 senses applied pressure P when tip 22 is depressed onto surface 18 of digitizer 10. Tip 22 is thereby depressed into body 20 of stylus 12. Sensor 24 then communicates the sensed applied pressure P to computer 14, which corresponds to a switch in a closed position. A closed switch is equivalent to a "press" action, as defined above. An open switch is equivalent to a "release" action, just as a mouse button may be pressed and released. Computer 14 has an operating system, preferably the Windows™ Operating System, or the MacIntosh™ Operating System, having an application including the double click function.

Figure 3:
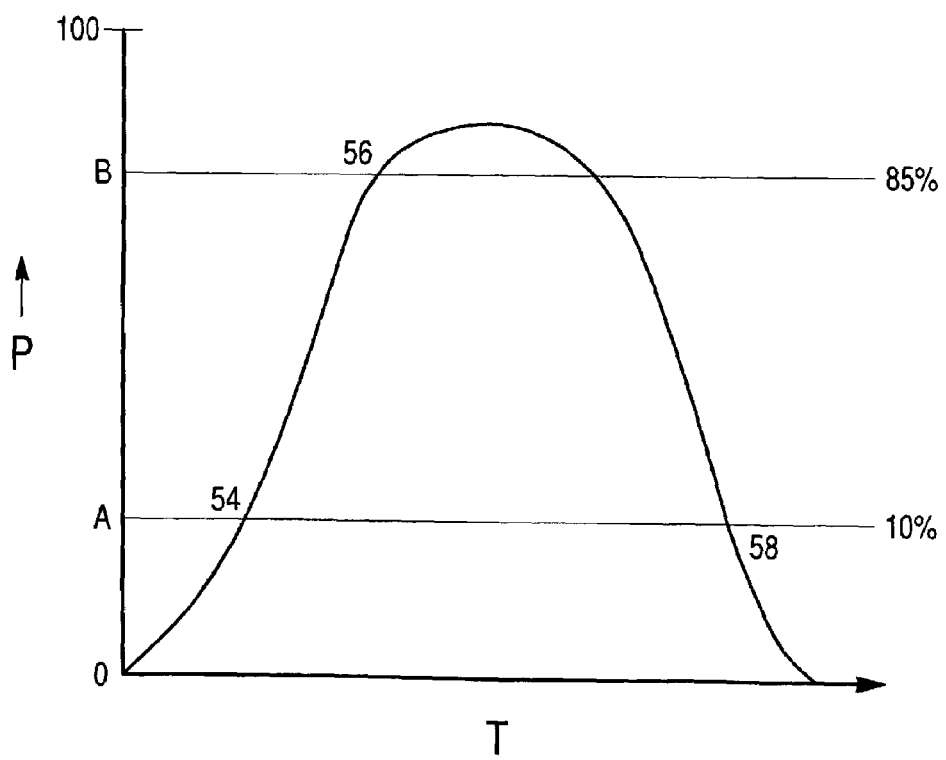
FIG. 3 is a graph of time versus pressure according to the first embodiment of the present invention.

As best shown in FIG. 3, a first function is triggered if sensor 24 senses applied pressure P that exceeds a first pressure threshold A, which is set relatively low, preferably no more than 10% of the total force range. A second function is triggered if sensor 24 senses applied pressure P that exceeds a second pressure threshold B, which is set relatively high, preferably at least 85% of the total force range.

If the sensed applied pressure P exceeds first pressure threshold A, information is generated by sensor 24 and sent to the operating system of computer 14 corresponding to a switch in a closed position at 54 in FIG. 3 (i.e. a "press" action). A first function may then be triggered. If the sensed applied pressure P thereafter exceeds second pressure threshold B, information is generated and sent to computer 14 corresponding to a switch in an open position immediately followed by a closed position at 56 in FIG. 3 (i.e. a "release" followed by "press" action). A second function may then be triggered in the application, preferably a double click action. Thereafter, when the sensed applied pressure P again falls below first threshold A at 58 in FIG. 3, information is generated and sent to computer 14 corresponding to a switch in an open position (i.e. a "release" action). Alternatively, the second function may be triggered when the sensed applied pressure P falls below first pressure threshold A at 58 in FIG. 3. Thus, the information generated is similar to the "press-release/press-release" action using a mouse button that triggers a double click action.

Note that the first embodiment may be such that a double click message is triggered as described above, but no first function is triggered when the sensed applied pressure P exceeds first pressure threshold A. Thus, it is not required that first pressure threshold A trigger any particular first function in the application. The disclosed invention may be applied so that first and second functions are activated, or only one function may be activated, such as the double click message.

Depending on the operating system, the particular application, or user preference, a second function, such as a double click, may be triggered unintentionally due to improper or unexpected stylus 12 movement, or some other user error. An application, such as a drawing application, may require that a user contact stylus 12 to surface 18 of digitizer 20 with varying degrees of force or at varying angles, which may also trigger an unwanted double click action. Therefore, various embodiments of the present invention are disclosed, providing the user with additional control for triggering a first and/or second function, thereby decreasing the possibility of unintentionally triggering such commands.

Figure 4:
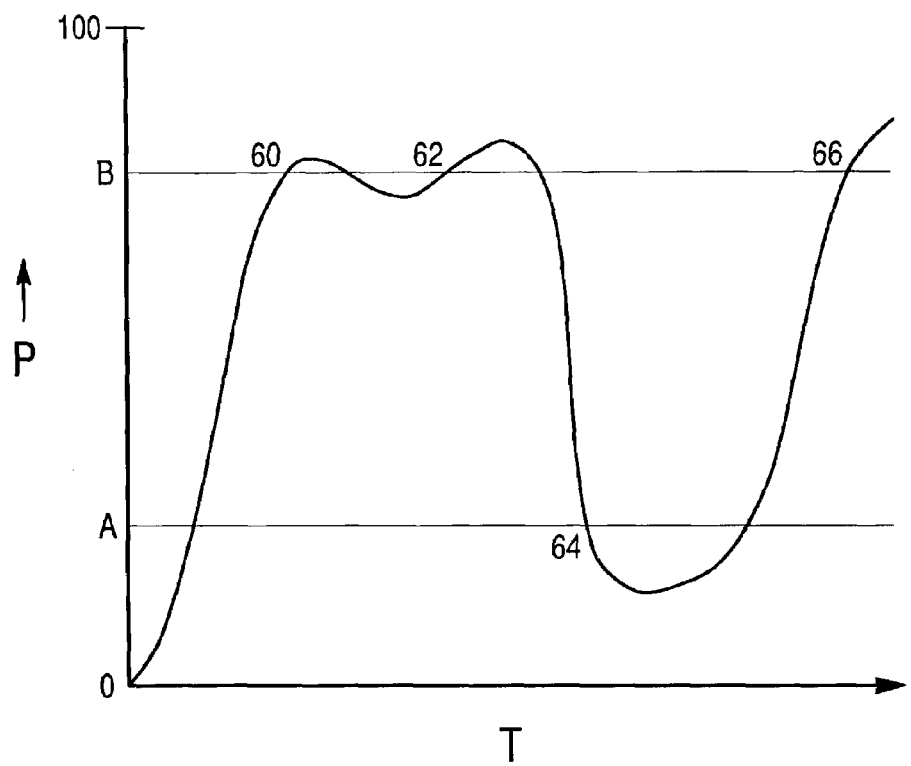
FIG. 4 is a graph of time versus pressure according to a second embodiment of the present invention.

In a second embodiment, a second function is only triggered in an application once after the sensed applied pressure P has exceeded second pressure threshold B. Thereafter, the second function will not be triggered again until the sensed applied pressure P first falls below first pressure threshold A, and then again exceeds second pressure threshold B. As best shown in FIG. 4, the second function may be triggered in the application at 60 after exceeding second pressure threshold B, as described above in the first embodiment. However, the second function will not be triggered at 62, because the second function has already been triggered once at 60, and the sensed applied pressure P has not dropped below first pressure threshold A. Thereafter, the second function may again be triggered at 66, given the sensed applied pressure P has dropped below first pressure threshold A at 64, and then exceeded second pressure threshold B at 66.

The second embodiment may be beneficial for certain applications wherein a constant pressure is applied on surface 18 with stylus 12, such as for drawing. The application may also require that the user apply variable pressure. First pressure threshold A may be set very low, for example less than 5% of the total force range, while second pressure threshold B may be set very high, for example at least 95% of the total force range. With the preferred settings, the user may then maintain continuous contact with stylus 12 on surface 18, and apply variable amounts of force to surface 18, without unintentionally triggering a second function such as a double click.

In a third embodiment, a second function is only triggered if the sensed applied pressure P exceeds the second pressure threshold B at a particular point at which the first pressure threshold A was exceeded. Therefore, the second function will not be triggered if the sensed applied pressure P exceeds first pressure threshold A at a first point, and thereafter the sensed applied pressure P exceeds second pressure threshold at a second point.

Depending on user preference, as well as application specifications, the particular point at which the second function may be triggered may be a particular location on display 16 where pointer 17 is displayed when first pressure threshold A is exceeded, as best shown on FIG. 1. This particular point may be defined by a certain area of pixels, or preferably by a particular area such as an icon or menu area displayed on display 16, as used in Windows™ operating systems. Therefore, an area proximate to the particular point indicated by pointer 17 on display 16 may trigger the second function (i.e. an icon). Thus, a double click may be triggered only if first and second pressure thresholds A and B are exceeded while pointer 17 is displayed and positioned on a desired icon. In the alternative, the particular point may be a particular location on surface 18 of digitizer 10, where stylus 12 initially contacts surface 18 and first pressure threshold A is exceeded, which may be defined by a particular pressure sensor 24, or group of sensors, in digitizer 10 that sensed the applied pressure which exceeded first pressure threshold A. The particular point, or area proximate the particular point, may be adjusted according to user preference and application specifications. Therefore the area in which the user may trigger a function may be variable. Thus, unintentional movement of either tip 22 of stylus 12, or pointer 17, may still trigger a function, if tip 22 maintains contact within the particular area and the appropriate pressure P is applied. In either case, the user need not release pressure from tip 22 on surface 18.

Figure 5:
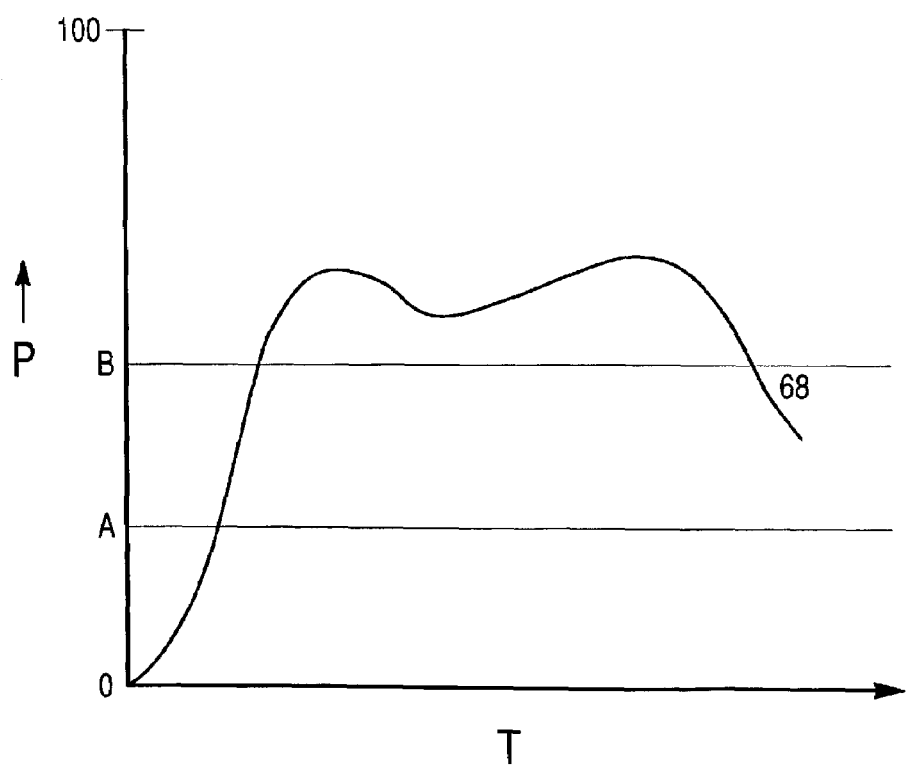
FIG. 5 is a graph of time versus pressure according to a fourth embodiment of the present invention.

In a fourth embodiment, a second function is triggered in an application after the sensed applied pressure P first exceeds second pressure threshold B, and then falls below second pressure threshold B at 68 in FIG. 5. The fourth embodiment is thus very similar to the first embodiment. However, such a configuration may be useful for various applications wherein a relatively large amount of force is usually applied on surface 18 with stylus 12. First pressure threshold A may again be set relatively low, for example less than 10% of the total force range. Second pressure threshold B may be set lower than in other preferred embodiments, though still higher than first pressure threshold A, for example at least 25% of the total force range. The user may then maintain a large amount of force on surface 18 with stylus 12 without unintentionally triggering a double click, or some other second function.

Note that the fourth embodiment may be applied in conjunction with other embodiments as described above. For example, a second function may only be triggered in an application once after the sensed applied pressure P has first exceeded second pressure threshold B, and then falls below second pressure threshold. Thus, elements of the second and fourth embodiment may be applied in conjunction. Similarly, a second function may only be triggered if the sensed applied pressure P first exceeds second pressure threshold B, and then falls below second pressure threshold B, but only if the sensed applied pressure P exceeded second pressure threshold B at the particular point at which first pressure threshold A was exceeded, as described above. Thus, elements of the third and fourth embodiments may be applied in conjunction.

Figure 6:
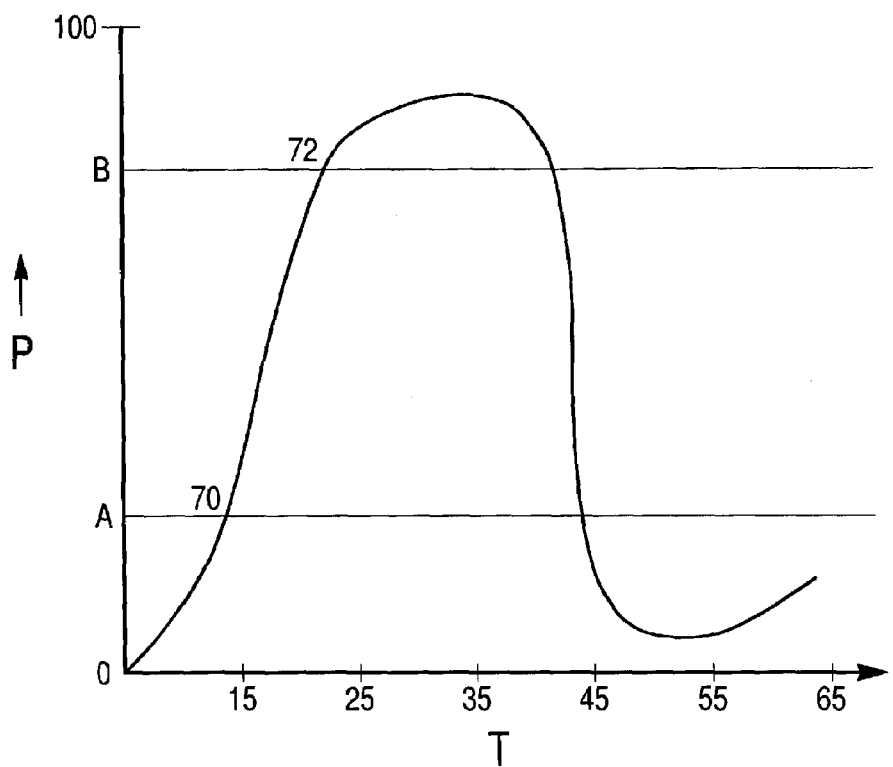
FIG. 6 is a graph of time versus pressure according to fifth embodiment of the present invention.

In a fifth embodiment, a second function is triggered in an application only if the sensed applied pressure P exceeds second pressure threshold B within a predetermined amount of time after having exceeded first pressure threshold A. Preferably, the predetermined amount of time is less than 1 second, though this may be adjusted depending on user preference. For example, a double click may be triggered in an application if the sensed applied pressure P exceeds first pressure threshold A at 70, and then exceeds second pressure threshold B within 1 second thereafter at 72, as best shown in FIG. 6. In contrast, if the sensed applied pressure A exceeds first pressure threshold A, and then exceeds second pressure threshold B more than 1 second thereafter, a double click will not be triggered. Note that FIG. 6 provides time T on the x-axis with points 1s through 6s for purposes of explanation only, wherein 1s equals one second, 2s equals two seconds, and so forth. However, the disclosed invention is not limited to these time frames. The predetermined amount of time may be adjusted depending on user preference, the application, or the operating system, wherein the predetermined amount of time exceeds one second.

Figure 7:
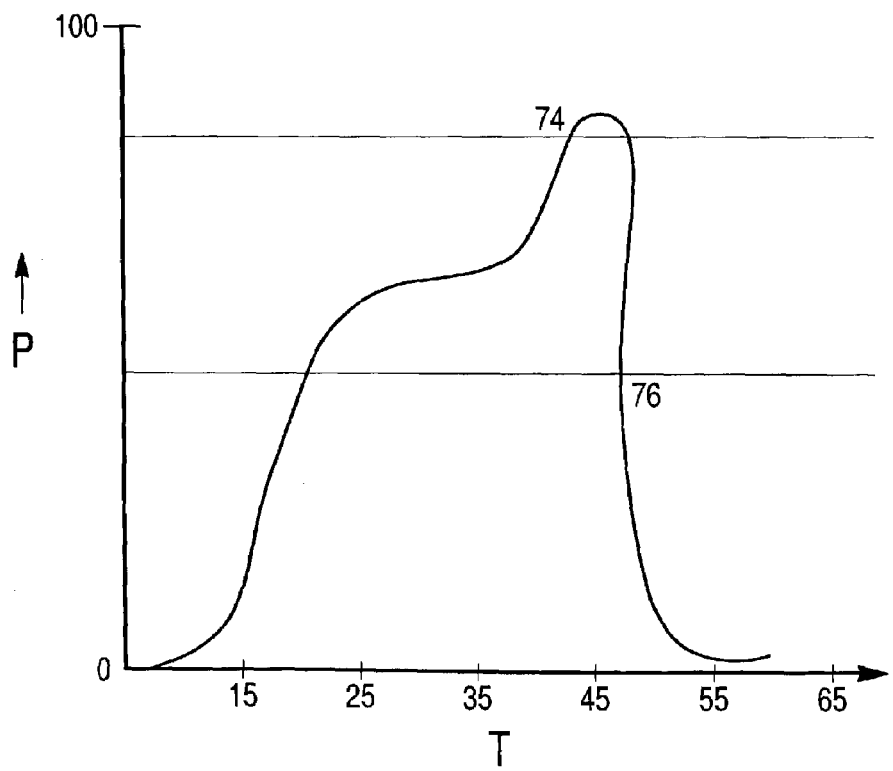
FIG. 7 is a graph of time versus pressure according to a sixth embodiment of the present invention.

In the sixth embodiment, a second function is triggered in an application if the sensed applied pressure P falls below first pressure threshold A within a predetermined amount of time after having exceeded second pressure threshold B. The sixth embodiment is therefore similar to the fifth embodiment. The predetermined amount of time is again preferably less than 1 second. As best shown in FIG. 7, a double click may be triggered in an application if the sensed applied pressure P falls below first pressure threshold A at 76 within 1 second after having exceeded second pressure threshold B at 74.

The disclosed invention also relates to a digitizer system comprising a digitizer 10 operably associated with a computer 14 and display 16, wherein computer 14 has an operating system and an application, as best shown in FIG. 1. A software driver is typically provided for installation on computer 14 to permit signals from digitizer 10 to be understood by the operating system and for the application. The disclosed invention is preferably implemented as a component of the software driver. Pressure may be applied to a surface 18 of digitizer 10 with a stylus 12, or some other pointing device, which is operably associated with digitizer 10. A sensor 24 is operably associated with either digitizer 10 or stylus 12, and senses pressure applied to surface 18 with stylus 12. If the sensed applied pressure P exceeds a first pressure threshold A, sensor 24 communicates with computer 14 and triggers in the application a first function. If the sensed applied pressure P exceeds a second pressure threshold B, sensor 24 communicates with computer 14 and triggers in the application a second function, such as a double click action. The second pressure threshold B is greater than the first pressure threshold A. The digitizer system senses the applied pressure with any known sensor, as disclosed above. The disclosed system may trigger first and second functions according to the embodiments described above. Therefore, same will not be repeated hereafter.

Although this invention has been described as having various embodiments, it is understood by one of ordinary skill in the art that various modifications, usages, adaptations and/or variations following the general principles of the invention can be made without departing from the scope or the spirit of the invention. Therefore, the present invention includes all such departures as come within known or customary practice in the art to which this invention pertains, and as may be applied to the central aspects set forth above, and which fall within the scope of the appended claims.

What is claimed is:

1. A method of triggering functions in a computer application, comprising the steps of:

providing a digitizer tablet having a stylus, the stylus interacting with the digitizer tablet using electromagnetic waves, wherein the digitizer and stylus are operably associated with a computer having an operating system and an application;

applying pressure to the digitizer tablet with the stylus;

sensing the applied pressure;

communicating the sensed pressure from the stylus to the digitizer tablet;

triggering in the application a first function if the sensed applied pressure exceeds a first pressure threshold level; and triggering in the application a second function if the sensed applied pressure exceeds a second pressure threshold level, wherein the second pressure threshold level is greater than the first pressure threshold level.

2. The method of claim 1, including the step of triggering the second function when the sensed applied pressure falls below the first pressure threshold level after having exceeded the second pressure threshold level.

3. The method of claim 2, including the further step of triggering the second function when the sensed applied pressure falls below the first pressure threshold level within a predetermined amount of time after having exceeded the second pressure threshold level.

4. The method of claim 3, wherein the predetermined amount of time is less than 1 second.

5. The method of claim 1, including the step of triggering the second function if the sensed applied pressure exceeds the second pressure threshold level within a predetermined amount of time after having exceeded the first pressure threshold level.

6. The method of claim 5, wherein the predetermined amount of time is less than 1 second.

7. The method of claim 1, wherein the second pressure threshold level is at least 85% of a total force range sensed by the sensor.

8. The method of claim 1, wherein the first pressure threshold level is less than 10% of a total force range sensed by the sensor.

9. The method of claim 1, including the step of triggering the second function after the sensed applied pressure falls below the second pressure threshold level after having exceeded the second pressure threshold level.

10. The method of claim 1, including the step of triggering the second function once each time the sensed applied pressure exceeds the first and second pressure threshold levels.

11. The method of claim 1, including the further steps of:
determining a position on a surface of the digitizer where the sensed applied pressure exceeds the first pressure threshold level; and
triggering the second function if the sensed applied pressure exceeds the second pressure threshold level at any area proximate to the position where the sensed applied pressure exceeded the first pressure threshold level.

12. The method of claim 11, wherein the area is variable.

13. The method of claim 12, including the step of triggering the second function if the sensed applied pressure falls below the second pressure threshold level after having exceeded the second pressure threshold level.

14. The method of claim 1, including the further steps of:
determining a particular location of a pointer displayed on a display operably associated with the application when the sensed applied pressure exceeds the first pressure threshold level; and
triggering the second function if the sensed applied pressure exceeds the second pressure threshold level when the pointer is displayed on the display at the particular location.

15. The method of claim 14, wherein the particular location is an icon or menu area of the application.

16. The method of claim 15, including the step of triggering the second function if the sensed applied pressure falls below the second pressure threshold level after having exceeded the second pressure threshold level.

17. The method of claim 1, wherein the first and second pressure threshold levels are adjustable.

18. A digitizer system, comprising;
a digitizer operably associated with a computer having an operating system and an application;
a stylus for applying pressure to said digitizer, and operably associated with said digitizer, said stylus interacting with said digitizer tablet using electromagnetic waves; and
a sensor operably associated with said stylus, said sensor for sensing pressure applied to said digitizer by said stylus and for communicating the sensed pressure to said digitizer to permit triggering of a first function if the sensed applied pressure exceeds a first pressure threshold level, and triggering a second function if the sensed applied pressure exceeds a second pressure threshold level, wherein the second pressure threshold level is greater than the first pressure threshold level.

19. The digitizer system of claim 18, wherein said sensor is selected from the group consisting of variable inductors, variable capacitors, variable resistors, magnets sliding past hall effect sensors, piezoelectric force sensors, and pressure sensors.

20. The digitizer system of claim 18, wherein the second function is triggered if the sensed applied pressure falls below the first pressure threshold level after having exceeded the second pressure threshold level.

21. The digitizer system of claim 18, wherein the second function is triggered if the sensed applied pressure falls below the first pressure threshold level within a predetermined amount of time of having exceeded the second pressure threshold level.

22. The digitizer system of claim 21, wherein the predetermined amount of time is less than 1 second.

23. The digitizer system of claim 18, wherein the second function is triggered if the sensed applied pressure exceeds the second pressure threshold level within a predetermined amount of time after having exceeded the first pressure threshold level.

24. The digitizer system of claim 23, wherein the predetermined amount of time is less than 1 second.

25. The digitizer system of claim 18, wherein the second pressure threshold level is at least 85% of a total force range sensed by said sensor.

26. The digitizer system of claim 18, wherein the first pressure threshold level is less than 10% of a total force range sensed by said sensor.

27. The digitizer system of claim 18, wherein the second function is triggered after the sensed applied pressure falls below the second pressure threshold level after having exceeded the second pressure threshold level.

28. The digitizer system of claim 18, wherein the second function is triggered once each time the sensed applied pressure exceeds the first and second pressure threshold levels.

29. The digitizer system of claim 18, wherein the second function is triggered if the sensed applied pressure exceeds the second pressure threshold level at an area proximate to a position on a surface of the digitizer where the sensed applied pressure exceeded the first pressure threshold level.

30. The digitizer system of claim 18, wherein the second function is triggered if the sensed applied pressure exceeds the first pressure threshold level when a pointer operably associated with a display is displayed at a particular location on the display, and thereafter exceeds the second pressure threshold level when the pointer is displayed within an area proximate the particular location on the display.

31. The digitizer system of claim 18, wherein the first and second pressure threshold levels are adjustable.

32. A digitizer system, comprising;
a digitizer operably associated with a display unit and a personal computer which controls the display unit to display images based on operation of the digitizer;
a pointing device for applying pressure to said digitizer, and operably associated with said digitizer, said pointing device interacting with said digitizer; and
a sensor operably associated with at least one of said pointing device and said digitizer, said sensor for sensing pressure applied to said digitizer by said pointing device and for communicating the sensed pressure to said personal computer, wherein said personal computer compares the sensed pressure to a first pressure threshold level and a second pressure threshold level to trigger a first function if the sensed pressure exceeds the first pressure threshold level and to trigger a second function if the sensed pressure exceeds the second pressure threshold level, the second pressure threshold level being greater than the first pressure threshold level.

33. The system of claim 32, wherein the pointing device includes a cable connected with the personal computer to provide the sensed pressure from the pointing device to the personal computer.

34. The system of claim 32, wherein the display unit includes an image of a movable pointer that indicates a position of the pointing device with respect to the digitizer.

35. The system of claim 32, wherein:
the display unit includes an image of a movable pointer that indicates a position of the pointing device with respect to the digitizer; and
the digitizer comprises a digitizer tablet arranged separate from the display unit, the pointing device being movable with respect to said digitizer tablet to move the image of the pointer in the display unit.

36. The system of claim 32, wherein the digitizer comprises a touch sensitive surface of the display unit that detects a position of the pointing device with respect to the digitizer.

37. The system of claim 36, wherein the personal computer triggers the second function when the second pressure threshold level and the first pressure threshold level are exceeded by the sensed pressure within a predetermined amount of time.

38. The system of claim 32, wherein the personal computer includes an operating system and an application program running thereon, the application program having a graphical user interface.

39. The system of claim 32, wherein the digitizer and the pointing device each include electronic circuitry components, the electronic circuitry components of the pointing device interacting with the electronic circuitry components of the digitizer via electromagnetic waves such that a position of the pointing device with respect to the digitizer is determined based on said electromagnetic waves.

40. The system of claim 32, wherein the pointing device comprises a stylus including said sensor, said stylus being in electrical communication with said personal computer.

* * * * *